(12) United States Patent
Huertgen et al.

(10) Patent No.: US 9,473,951 B2
(45) Date of Patent: Oct. 18, 2016

(54) MOBILE COMMUNICATION APPARATUSES, METHOD FOR PERFORMING SIGNAL RECEPTION QUALITY MEASUREMENTS AND METHOD FOR ASCERTAINING A MOVEMENT BY A MOBILE COMMUNICATION APPARATUS

(71) Applicant: Intel Mobile Communications GmbH, Neubiberg (DE)

(72) Inventors: Frank Huertgen, Krefeld (DE); Roland Hellfajer, Bochum (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

(21) Appl. No.: 13/910,159

(22) Filed: Jun. 5, 2013

(65) Prior Publication Data
US 2013/0337848 A1    Dec. 19, 2013

(30) Foreign Application Priority Data

Jun. 13, 2012 (DE) .................. 10 2012 105 103

(51) Int. Cl.
*H04W 24/00* (2009.01)
*H04W 36/32* (2009.01)
*H04W 36/00* (2009.01)

(52) U.S. Cl.
CPC ............ *H04W 24/00* (2013.01); *H04W 36/32* (2013.01); *H04W 36/0022* (2013.01); *H04W 36/0088* (2013.01)

(58) Field of Classification Search
CPC .................................................. H04W 24/00
See application file for complete search history.

(56) References Cited

U.S. PATENT DOCUMENTS

| | | | | |
|---|---|---|---|---|
| 5,987,325 A * | 11/1999 | Tayloe | ...................... | 455/435.2 |
| 6,067,460 A * | 5/2000 | Alanara et al. | ............... | 455/574 |
| 8,195,234 B2 | 6/2012 | Chang et al. | | |
| 8,588,808 B2 * | 11/2013 | Levin et al. | ............... | 455/456.1 |
| 2004/0102159 A1 * | 5/2004 | Suda et al. | ................. | 455/67.11 |
| 2006/0246895 A1 * | 11/2006 | Ryu | .............................. | 455/434 |
| 2010/0075716 A1 * | 3/2010 | Chang et al. | ................. | 455/558 |

(Continued)

FOREIGN PATENT DOCUMENTS

| | | |
|---|---|---|
| CN | 1183702 A | 6/1998 |
| CN | 1996900 A | 7/2007 |

(Continued)

OTHER PUBLICATIONS

Machine translation of DE102010033839.*

(Continued)

*Primary Examiner* — Vladimir Magloire
*Assistant Examiner* — David Orange
(74) *Attorney, Agent, or Firm* — Viering, Jentschura & Partner

(57) ABSTRACT

A mobile communication apparatus is provided, which may have a receiver, and may ascertain whether a movement of the apparatus is below a prescribed limit and on that basis may prompt the receiver of the mobile communication apparatus to perform a signal reception quality measurement. A mobile communication apparatus is also provided, which may have a transmission/reception device, and may ascertain whether a movement of the apparatus is below a prescribed limit based on a set of radio cells in a mobile radio communication that is active, a radio cell that serves the mobile communication apparatus, or a set of adjacent radio cells that is configured for the mobile communication apparatus.

12 Claims, 8 Drawing Sheets

(56) References Cited

U.S. PATENT DOCUMENTS

2010/0323657 A1* 12/2010 Barnard et al. ............ 455/404.1
2010/0323714 A1* 12/2010 Schmidt et al. ........... 455/456.1
2012/0122527 A1*  5/2012 Fyke ............................ 455/574

FOREIGN PATENT DOCUMENTS

| CN | 101198136 A | * | 6/2008 | ............ H04W 48/20 |
| CN | 101247591 A | * | 8/2008 | ........... H04B 1/3827 |
| CN | 101557615 A | | 10/2009 | |
| CN | 101686575 A | | 3/2010 | |
| DE | 102010033839 A1 | | 2/2012 | |
| EP | 0812119 A2 | | 12/1997 | |

OTHER PUBLICATIONS

Chinese Office Action received for Application No. 201310310699.7 dated Nov. 25, 2015, 7 pages and its English translation 14 pages.

* cited by examiner

FIG 8
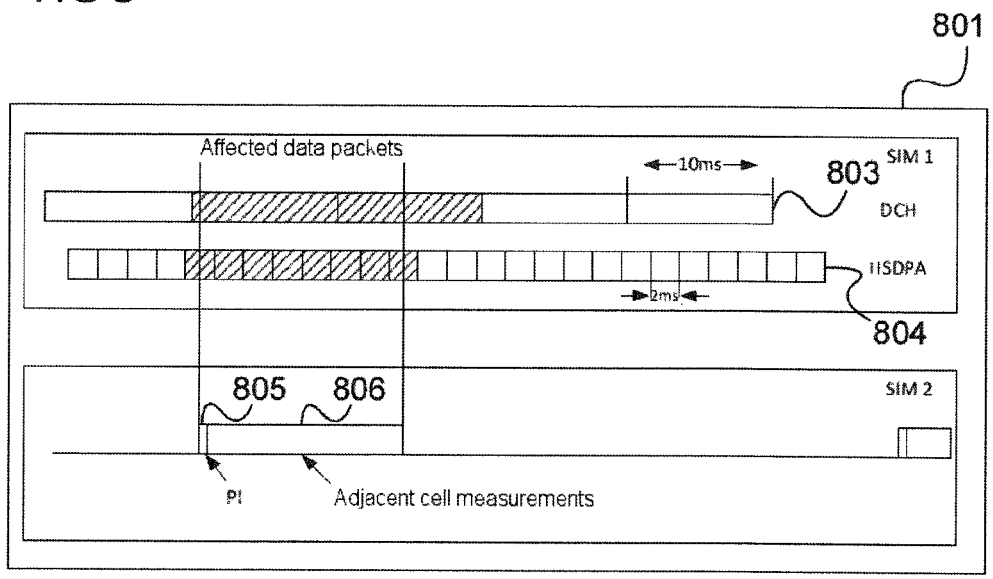
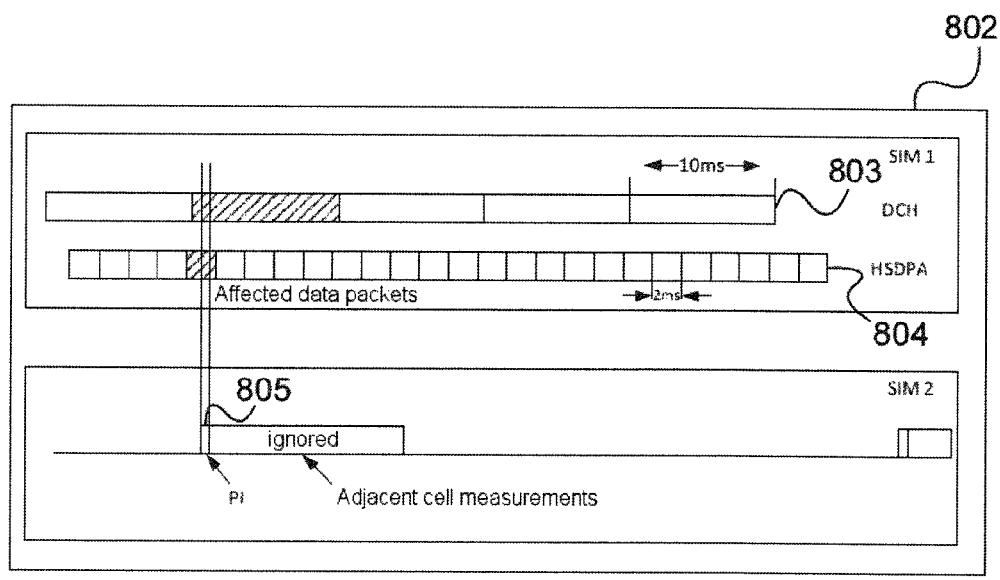

MOBILE COMMUNICATION APPARATUSES, METHOD FOR PERFORMING SIGNAL RECEPTION QUALITY MEASUREMENTS AND METHOD FOR ASCERTAINING A MOVEMENT BY A MOBILE COMMUNICATION APPARATUS

CROSS-REFERENCE TO RELATED APPLICATION

This application claims priority to German Patent Application Serial No. 10 2012 105 103.8, which was filed Jun. 13, 2012, and is incorporated herein by reference in its entirety.

TECHNICAL FIELD

Various aspects of this disclosure relate to mobile communication apparatuses, methods for performing signal reception quality measurements and methods for ascertaining a movement by a mobile communication apparatus.

BACKGROUND

A mobile communication apparatus, such as a mobile radio terminal, typically performs measurements, e.g. signal reception quality measurements, for example as part of the decision concerning whether a handover from the radio cell which is currently serving the mobile radio terminal (i.e. the serving cell of the mobile radio terminal) to another radio cell needs to be performed on the basis of the movement of the mobile radio terminal. Such measurements encumber the receiver in the mobile radio terminal, which can result in it not being able to perform other tasks, for example when the mobile radio communication apparatus is operated with two SIM (Subscriber Identity Module) cards in it not being able to receive data that are sent to the mobile radio terminal using a communication link that exists for one of the two SIM cards when measurements are being performed for the other SIM card.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 8 shows a first diagram for the case with adjacent cell measurements and a second diagram for the case without adjacent cell measurements.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

The detailed description which follows relates to the accompanying figures, which, by illustration, show specific details and embodiments in which the invention can be implemented. These embodiments are described in sufficient detail to allow a person skilled in the art to implement the invention. Other embodiments can be used and structural, logical and electrical changes can be made without departing from the scope of the invention. The various embodiments are not necessarily mutually exclusive, since some embodiments can be combined with one or more other embodiments in order to form new embodiments.

Figure 1:
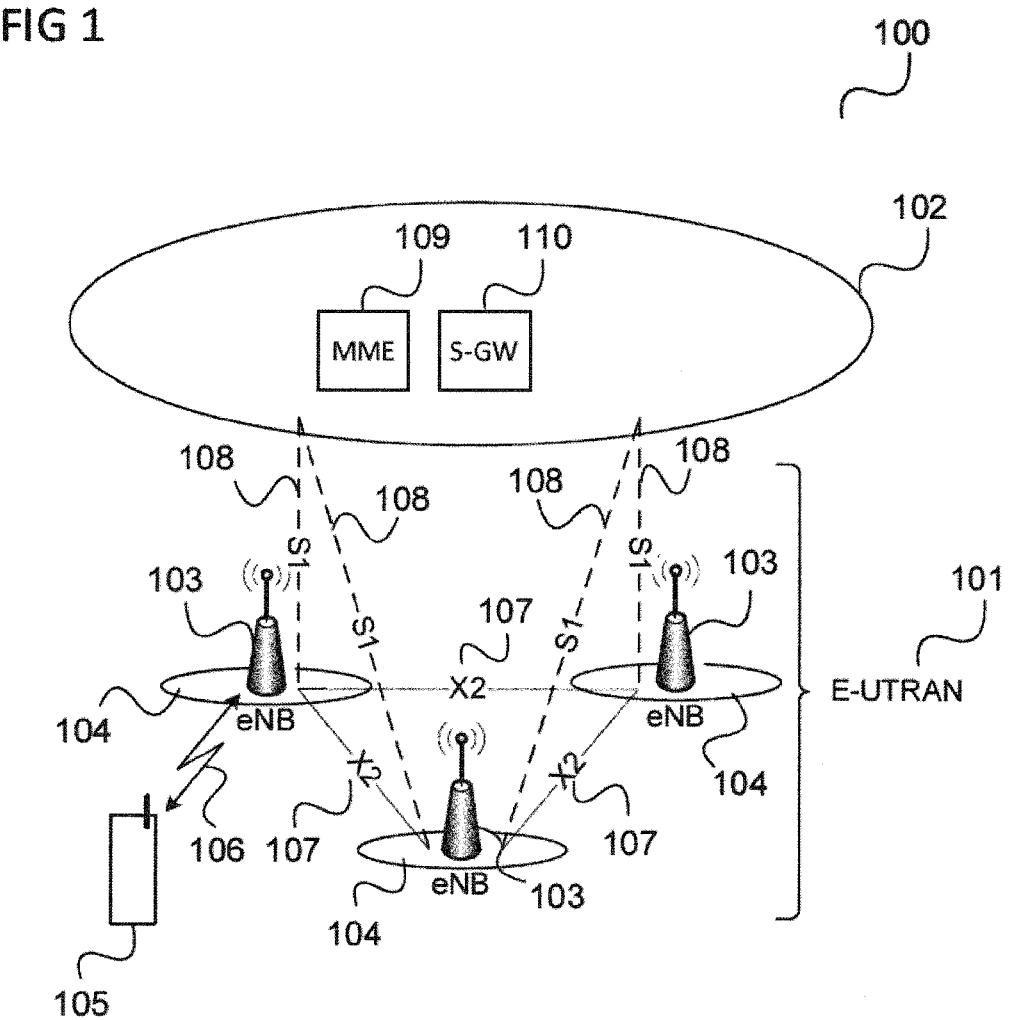
FIG. 1 shows a communication system.

FIG. 1 shows a communication system 100.

The communication system 100 is a cellular mobile communication system which has a radio access network (for example an E-UTRAN, Evolved UMTS (Universal Mobile Communications System) Terrestrial Radio Access Network based on LTE (Long Term Evolution)) 101 and a core network (for example an EPC (Evolved Packet Core) based on LTE) 102. The radio access network 101 may have base (transmission/reception) stations (for example eNodeBs, eNBs based on LTE) 103. Each base station 103 provides radio coverage for one or more mobile radio cells 104 in the radio access network 101.

A mobile terminal (also called UE (User Equipment)) 105 that is in a mobile radio cell 104 can communicate with the core network 102 and with other mobile terminals 105 via the base station which covers (in other words operates) the mobile radio cell.

Control data and user data are transmitted between a base station 103 and the mobile terminal 105, which is in the mobile radio cell 104 that is operated by the base station 103, via the air interface 106 on the basis of a multiple access method.

The base stations 103 are connected to one another by means of an interface 107, for example an X2 interface. The base stations 103 are also connected to the core network, for example to a mobile management entity (MME) 109 or a serving gateway (S-GW) 110, by means of a second interface 108, for example an S1 interface. By way of example, the MME 109 is responsible for controlling the mobility of mobile terminals which are in the coverage area of the E-UTRAN, while the S-GW 110 is responsible for handling the transmission of user data between mobile terminals 105 and the core network 102.

It is subsequently assumed that base stations 103 are present which are able to support different radio access technologies and are able to belong to different mobile radio communication networks. By way of example, a base station 103 is able to provide a radio communication link via the air interface between itself and the mobile terminal 105 on the basis of LTE, UMTS, GSM (Global System for Mobile Communications) and EDGE (Enhanced Data Rates for GSM Evolution) radio access. Accordingly, the radio access network can operate as an E-UTRAN, UTRAN or GERAN (GSM EDGE Radio Access Network). Similarly, the core network 102 is able to contain the functionality of an EPC, a UMTS core network or a GSM core network. Two base stations 103 which support the communication on the basis of different radio access technologies may accordingly be connected to different core networks 102 and belong to different radio access networks 101 (for example from different operators), and the radio cells operated by the base stations 103 can overlap, with the result that both radio access networks can be used in the overlap area. Such a scenario is shown in FIG. 2.

Figure 2:
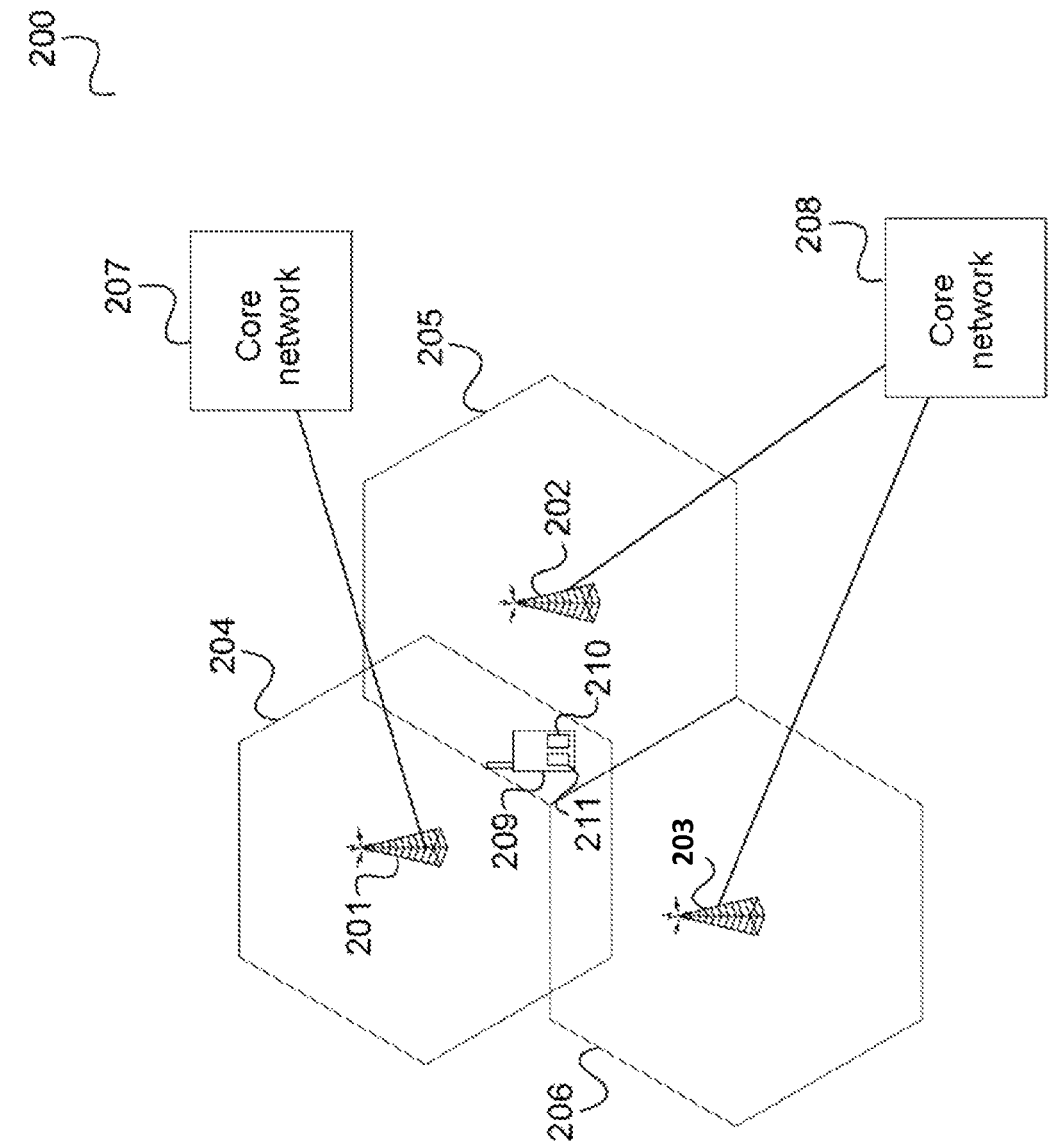
FIG. 2 shows a communication arrangement.

FIG. 2 shows a communication arrangement 200.

The communication arrangement has a first base station 201, which operates a first radio cell 204, a second base station 202, which operates a second radio cell 205, and a third base station 203, which operates a third radio cell 206. The base stations 201, 202, 203 correspond to the base stations 103, for example, and the radio cells 204, 205, 206 correspond to the radio cells 104, for example. In this example, the first base station 201 belongs to a first mobile radio communication network and is accordingly connected to a first core network 207, which belongs to the first mobile radio communication network. The second base station 202 and the third base station 203 belong to a second mobile radio communication network and are accordingly connected to a second core network 208, which belongs to the second mobile radio communication network.

In this example, a user with his mobile radio terminal 209, which corresponds to the mobile terminal 105, for example, is located in the area of overlap between the first radio cell 204 and the second radio cell 205.

In this case, the user can use both the first mobile radio communication network and the second mobile radio communication network for communication. To this end, the mobile radio terminal 209 may be equipped with both a first SIM (Subscriber Identity Module) card 210 for the first mobile radio communication network and a second SIM card 211 for the second mobile radio communication network so that the user is able to use both mobile radio communication networks as home networks.

Among users of mobile radio communication networks, it is possible to observe the trend for simultaneous use of a plurality of SIM (Subscriber Identity Module) cards and accordingly a plurality of mobile radio contracts. Reasons are firstly that it allows costs to be split (for example one SIM card from an employer for business calls and a further SIM card for private use) and secondly tariff optimization incentives (one SIM with optimum tariff structure for a first roaming zone and a further SIM with an optimum tariff structure for a second roaming zone).

It is desirable for the user for it to be possible to use at least two SIM cards 210, 211 in the mobile radio 209 (at best even simultaneously, i.e. so that it is possible to communicate with the first mobile radio communication network and the second communication network simultaneously) without the mobile radio terminal 209 needing to have costly supplementary parts (for example two RF parts and/or two baseband reception units). However, there is typically no provision for such simultaneous use of two SIM cards in the current mobile radio standards (for example UMTS) and it is not supported by the network operators.

If the two SIM cards 210, 211 belong to different network operators, the actions of the two SIM cards 210, 211, for example in the case of UMTS, take place on different reception frequencies. If there is now a connection between the mobile radio terminal 209 and the first mobile radio network (e.g. for the first base station 201), for example, a reception frequency which is assigned to the first SIM card 210 is occupied continuously for the connection. However, accessibility of the second SIM card 211 typically requires the mobile radio terminal 209 to use a second reception frequency, which is associated with the second SIM card 211, to perform operations at least occasionally, for example at an interval of one second.

For the operations on the second reception frequency, however, it is, when the mobile radio terminal has components which are used for both SIM cards 210, 211 (for example just one RF receiver or a baseband receiver), that the connection which exists for the first SIM card 209 is interrupted in order to be able to change over the jointly used components for reception or processing for the second SIM card 211. However, an interruption in the connection on the first SIM card 210 results in potential disadvantages such as interference in the reception and a reduction in the data rate. Furthermore, it should be borne in mind that the interruption in connections is unfavorable from the point of view of the network operators, since the gaps mean that more bandwidth needs to be expended for the connection than would be the case without the parallel accessibility on a second SIM card.

In addition, on the basis of the 3GPP standard, it is necessary, by way of example, that as soon as the mobile radio 209 is registered with the second SIM card 210 on a radio cell, for example on the second radio cell 205, reception quality measurements (for example RSCP (Received Signal Code Power) measurements and EcN0(Bit Energy-to-Noise Density) measurements) on the second radio cell 205 itself and typically also on its adjacent cells, in this example the third radio cell 206, are performed. This requires additional availability of jointly used components (for example the RF receiver) and hence the requirement for even greater interruptions in the connection which exists for the first SIM card. Even in the stationary case (i.e. the mobile radio terminal 209 is not moving), however, it is necessary (even with very good reception conditions) to perform at least measurements on the second radio cell 205, on which the mobile radio terminal 209 is registered.

Under particular constraints—namely stationary operation of the mobile radio terminal 209—, accessibility on the second SIM card 211 is implemented almost without influence on an existing connection to the first SIM card 210. In addition, mechanisms are provided to allow stationary operation to be detected.

Figure 3:
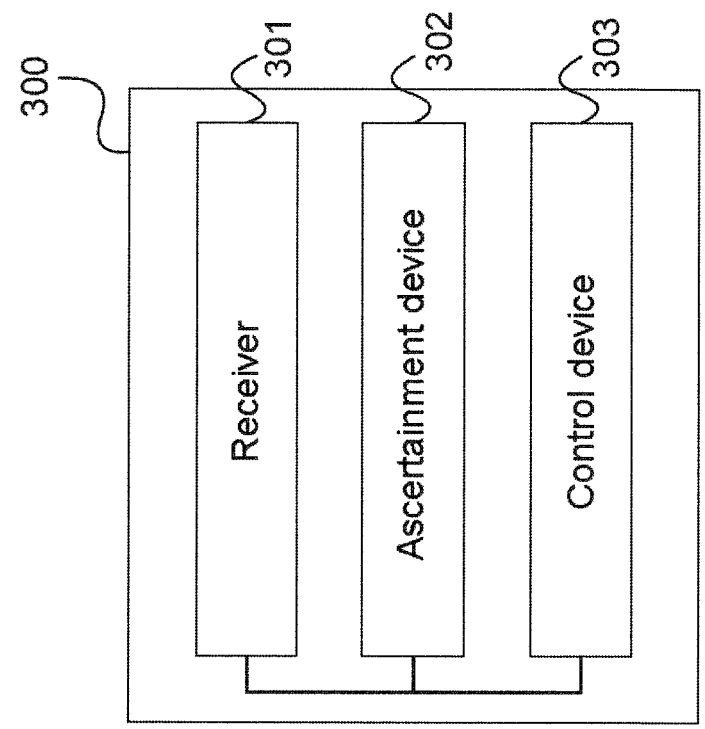
FIG. 3 shows a mobile communication apparatus.

A mobile communication apparatus as shown in FIG. 3 may be provided.

FIG. 3 shows a mobile communication apparatus 300.

The mobile communication apparatus 300 has a receiver 301 and an ascertainment device 302 which is set up to ascertain whether the movement of the mobile communication apparatus is below a prescribed limit.

The mobile communication apparatus 300 also has a control device which is set up to prompt the receiver to perform a signal reception quality measurement on the basis of whether the movement of the mobile communication apparatus is below the prescribed limit.

In other words, a mobile communication apparatus detects whether its movement is within a particular margin, for example whether its speed of movement is below a threshold value, i.e. whether the mobile communication apparatus is moving only slowly, whether the mobile communication apparatus is not moving away from a particular location, or in other words whether it is stationary or almost stationary, and takes this as a basis for deciding whether the reception quality of a signal needs to be measured. According to the decision, a receiver in the mobile communication apparatus is controlled. The fact that the movement is below the prescribed limit can mean that the speed is below a threshold value or that the mobile communication apparatus is moving within particular margins, e.g. within a prescribed geographical area. The fact that the movement is below the prescribed limit can also mean that the mobile communication apparatus is stationary (or at least is moving so little that the ascertainment device ascertains that the mobile communication apparatus is stationary).

If the signal reception quality measurement relates to one of two SIM cards in the mobile communication apparatus (for example the second SIM card 211), e.g. for the accessibility via the SIM card (i.e. via the telephone number associated with the SIM card, for example), it is possible to dispense with the signal reception quality measurement for the SIM card, for example, with the result that a connection for the other SIM card (for example the first SIM card 210) is not interrupted or is interrupted less (e.g. less frequently or for a shorter time) (for example if the mobile communication apparatus has a receiver which is used both for communication services of the first SIM card and for communication services of the second SIM card). By way of example, it is thus possible to minimize the number of measurements for the second SIM card 211 in stationary operation to the extent that, from the point of view of the network and the user, the connection by the first SIM card can be denoted as interference-free.

Static (i.e. stationary) operation covers not all instances of application but a large portion thereof: for example, the majority of the users typically stay in one location, for example at home or at the workplace, for a relatively long time. By way of example, physically static (or in other words stationary) is intended to be understood to mean that the reception conditions for the accessible networks do not change significantly. Hence, a mobile communication apparatus may be regarded as stationary (or its movement may be regarded as below the limit) even when it is moving a little, for example when it is moving slowly and only for a short time (i.e. its speed is below a prescribed limit value) or when it is not moving far, for example is moving only within a relatively (in comparison with the size of the radio cell) small limited geographical area (for example within a genuine part of the radio cell, e.g. an area which is less than half or a quarter of the size of the radio cell, e.g. the serving radio cell), for example just within a building.

The stationary operation of the mobile radio may be recognized by the evaluation of adjacent cell measurements on the SIM card with the active connection, i.e. the first SIM card 210, for example, and identification of the stationary state involves dispensing with measurements (e.g. all measurements) which belong to the second SIM card 211 (i.e. which correspond to the operation of the mobile radio terminal 209 as a subscriber device identified by the second SIM card 211) and instead using the last measured value prior to the setup of the communication link which exists with the first SIM card 210. Hence, interruptions in the data transmission via the communication link are reduced. The mobile radio terminal 209 may report the last measured value from a reception quality measurement (or an earlier measured value) to the mobile radio network in order to simulate to the mobile radio network that it is performing a reception quality measurement. Depending on the communication standard which is used, dispensing with the reception quality measurements may be an infringement of the communication standard that may be accepted in order to reduce the influence on an existing communication link.

By way of example, the control device is set up to prompt the receiver to perform the signal reception quality measurement if the movement is not below the prescribed limit and to prompt the receiver not to perform the signal reception quality measurement if the movement is below the prescribed limit.

By way of example, the ascertainment device is set up to ascertain whether the mobile communication apparatus is stationary.

By way of example, the control device is set up to prompt the receiver to perform the signal reception quality measurement if the mobile communication apparatus is not stationary and to prompt the receiver not to perform the signal reception quality measurement if said mobile communication apparatus is stationary.

In addition, the mobile communication apparatus may have a first subscriber identity module (e.g. a first SIM card) for using a first mobile radio communication network and a second subscriber identity module (e.g. a second SIM card) for using a second mobile radio communication network, wherein the control device is set up, by way of example, to use the receiver to maintain a communication link to the first mobile radio communication network and wherein the signal reception quality measurement is, by way of example, a measurement of the reception quality of a signal received by the receiver from the second mobile radio communication network.

By way of example, the ascertainment device is set up to take at least one configuration parameter from the receiver for using the communication link as a basis for ascertaining whether the movement of the mobile communication apparatus is below the prescribed limit.

By way of example, the signal reception quality measurement is the measurement of the reception quality of the radio cell which serves the mobile communication apparatus.

The signal reception quality measurement may also be the measurement of the reception quality of a radio cell which is adjacent to the radio cell which serves the mobile communication apparatus.

Figure 4:
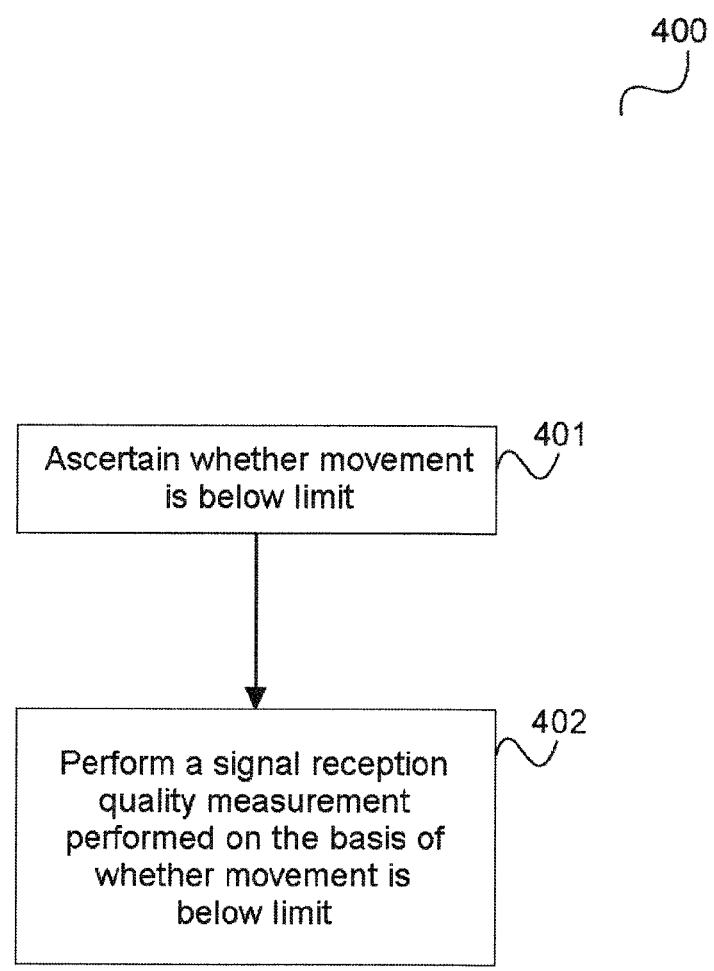
FIG. 4 a flowchart shows.

By way of example, the mobile communication apparatus is a mobile radio terminal By way of example, the mobile communication apparatus 300 carries out a method as shown in FIG. 4.

FIG. 4 shows a flowchart 400.

The flowchart 400 illustrates a method for performing signal reception quality measurements by a mobile communication apparatus.

In 401, the method ascertains whether the movement of the mobile communication apparatus is below a prescribed limit.

In 402, a receiver in the mobile communication apparatus performs a signal reception quality measurement on the basis of whether the movement of the mobile communication apparatus is below the prescribed limit.

Whether the movement of the mobile communication apparatus is below the limit (for example whether the mobile communication apparatus is stationary) may be ascertained on the basis of one (or more) configuration parameter(s) from the receiver (or a transmission/reception device), for example. This is shown in FIG. 5.

Figure 5:
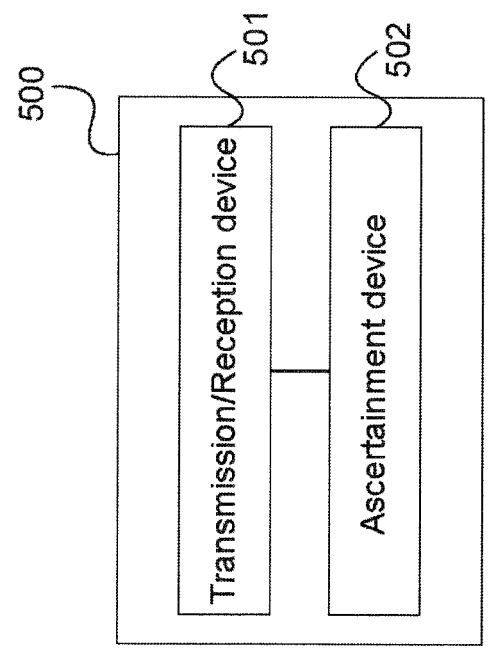
FIG. 5 shows a mobile communication apparatus.

FIG. 5 shows a mobile communication apparatus 500.

The mobile communication apparatus 500 has a transmission/reception device 501 for communicating with a mobile radio communication network.

The mobile communication apparatus 500 also has an ascertainment device which is set up to take at least one configuration parameter from the transmission/reception device as a basis for ascertaining whether the movement of the mobile communication apparatus is below a prescribed limit.

In other words a radio configuration parameter may be used to ascertain whether the mobile communication apparatus is moving (or whether the movement thereof at least remains within particular margins). By way of example, it is observed whether or not the radio configuration parameter alters, and if it is does not alter (for example for a particular period of time), it is established that the movement of the mobile communication apparatus is below the limit, and if it does alter, it is established that the movement of the mobile communication apparatus is not below the limit.

By way of example, the ascertainment device is set up to take the at least one configuration parameter as a basis for ascertaining whether the mobile communication apparatus is stationary.

By way of example, the transmission/reception device is set up to receive the configuration parameter from the mobile radio communication network.

The ascertainment device may be set up to take whether the configuration parameter changes as a basis for ascertaining whether the movement of the mobile communication apparatus is below a prescribed limit.

By way of example, the configuration parameter is a configuration parameter that is configured by the mobile radio communication network for the mobile communication apparatus.

By way of example, the configuration parameter is the set of radio cells in the mobile radio communication network that is active for the mobile communication apparatus (i.e. the active set), the radio cell which serves the mobile communication apparatus (i.e. the serving cell) or the set of adjacent radio cells that is configured for the mobile communication apparatus.

Figure 6:
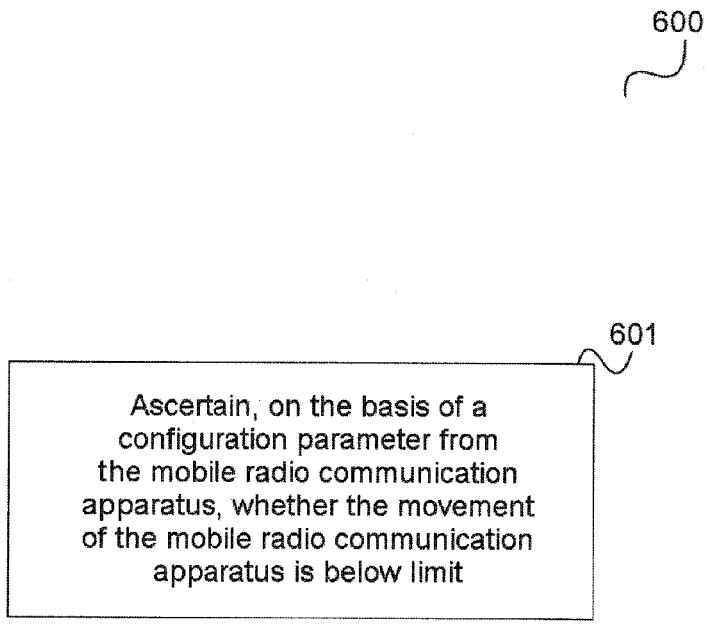
FIG. 6 shows a flowchart.

By way of example, the mobile communication apparatus 500 carries out a method as shown in FIG. 6.

FIG. 6 shows a flowchart 600 according to one embodiment.

The flowchart 600 illustrates a method for ascertaining a movement by a mobile communication apparatus.

In 601, the method ascertains, on the basis of at least one configuration parameter from a transmission/reception device in the mobile communication apparatus, whether the movement of the mobile communication apparatus is below a prescribed limit.

It should be borne in mind that embodiments which are described in connection with the mobile radio communication apparatuses 400, 300 are similarly valid for those with reference to the methods illustrated in FIG. 4 and FIG. 6, and vice versa.

By way of example, components of the mobile radio communication apparatuses 300, 500 (receiver, ascertainment device, control device etc.) can be implemented by means of a circuit.

In one embodiment, a "circuit" is intended to be understood to mean any unit which implements a piece of logic and which may be hardware, software, firmware or a combination thereof Hence, in one embodiment, a "circuit" may be a hardwired logic circuit or a programmable logic circuit, such as a programmable processor, e.g. a microprocessor (e.g. a CISC (Complex Instruction Set Computer) processor or an RISC (Reduced Instruction Set Computer) processor). A "circuit" may also be intended to be understood to mean a processor which executes any type of software, e.g. a computer program, for example a computer program in programming code for a virtual machine, such as a Java computer program. In one embodiment, a "circuit" may be intended to be understood to mean any type of implementation of the functions described subsequently.

The text below describes an exemplary embodiment in relatively great detail with reference to the communication arrangement 200 shown in FIG. 2 and the progression shown in FIG. 7.

Figure 7:
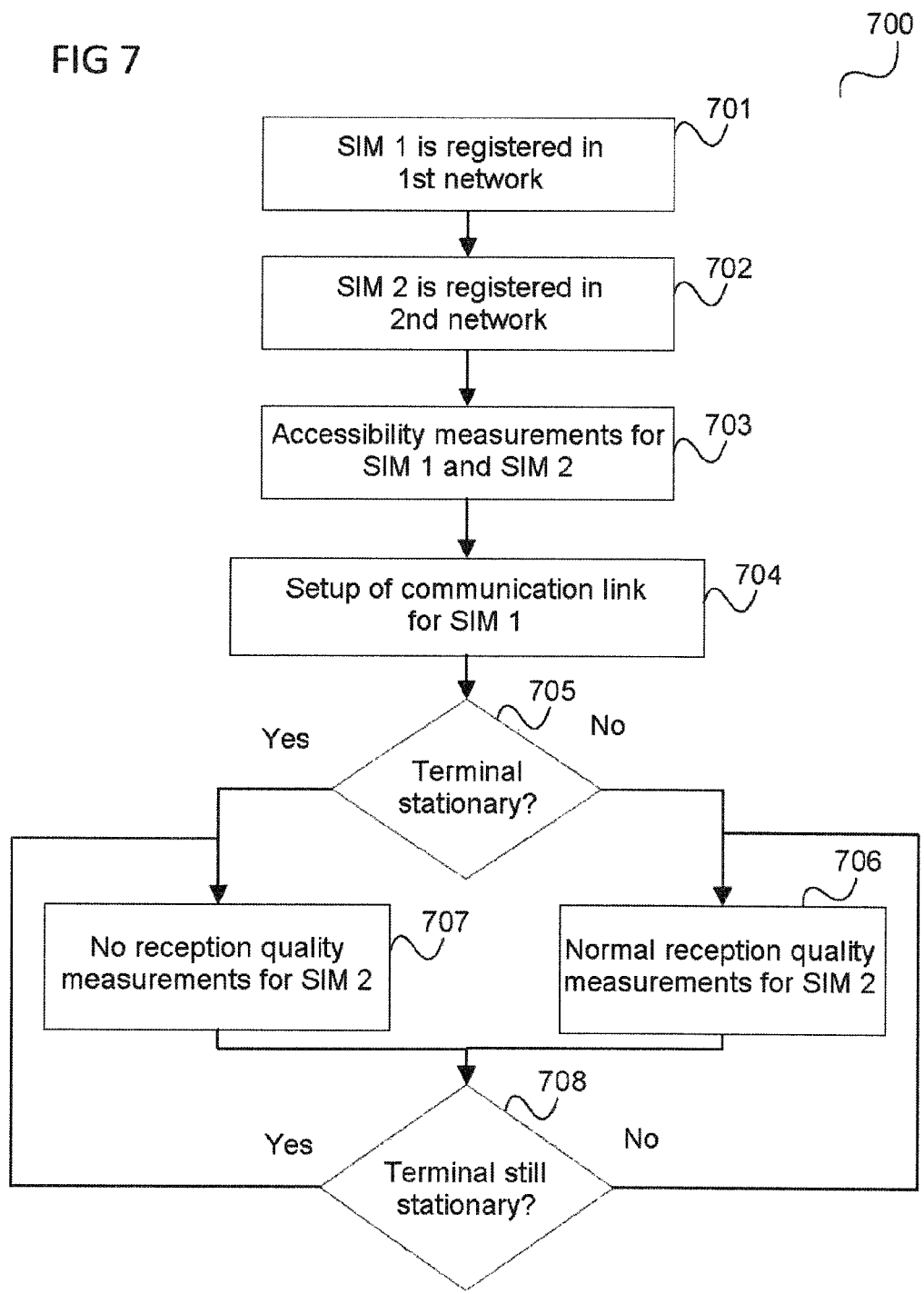
FIG. 7 shows a flowchart.

FIG. 7 shows a flowchart 700.

In 701, the mobile radio terminal 209 uses the first SIM card 210 to register in the first radio cell 204 of the first mobile radio communication network.

In 702, the mobile radio terminal 209 uses the second SIM card 211 to register in the second radio cell 205 of the second mobile radio communication network. Subsequently, the mobile radio terminal 209 is then in idle mode, for example, in respect of the second SIM card 211.

The first mobile radio communication network and the second mobile radio communication network are not necessarily different networks. The first SIM card 210 and the second SIM card 211 may also be SIM cards for the same mobile radio communication network (i.e. have the same home network or come from the same operator).

By way of example, the first mobile radio communication network and the second mobile radio communication network are UMTS mobile radio communication networks. Accordingly, the mobile radio terminal 209 performs the following operations both for the first radio cell 204 and for the second radio cell 205 on the basis of UMTS periodically, for example at an interval of 1.28 seconds, in order to be accessible following registration in the first radio cell 204 and in the second radio cell 205:

1) Synchronization with the radio cell 204, 205.

2) Reading of the paging indicator channel from the radio cell 204, 205.

3) Depending on the result of the paging indicating channel: reading of the paging channel.

4) Measurement of the radio cell 204, 205 (i.e. measurement of the reception quality in the radio cell 204, 205).

5) Depending on the network configuration: measurement of other radio cells on the same frequency (e.g. the third radio cell 206).

6) Depending on the network configuration: measurement of other radio cells on an (or two) interfrequency/interfrequencies.

In 704, the mobile radio terminal uses the first base station 201 to set up a communication link to the first mobile radio network. The communication link exists for the first SIM card 210, i.e. the mobile radio terminal 209 uses the communication link as the subscriber that corresponds to the first SIM card 210.

Performing the operations for accessibility for the second SIM card 211, for example operations 1) to 6) above, would typically mean an interruption in the data reception by means of the communication link of, for example in the case of UMTS, 50 to 100 ms per cycle (that is to say per 1.28 sec, for example), depending on the implementation of the measurements.

In this case, the length of interruption is typically significantly determined by the reception quality measurements, i.e. operations 4) to 6). The reception quality measurements are requested by the second mobile radio network, but only for the purpose of initiating reregistration on another radio cell in the event of changing reception conditions. For the physically static instance of application, they have no benefit because the mobile radio network would in this case not instruct the mobile radio terminal to reselect the serving cell (i.e. the radio cell serving the mobile radio terminal).

The reception quality measurements may therefore not be performed in stationary operation and, by way of example, a constant reception quality is assumed (e.g. a constant RSCP/EcN0 value), which is justified in physically static operation.

Accordingly, the mobile radio terminal 209 ascertains in 705 whether it is stationary. By way of example, the stationary state of the mobile radio 209 is recognized by observing parameters (e.g. UMTS configuration parameters) for the first SIM card 210, for which the communication link exists, i.e. parameters which relate to the use of the first mobile radio network by means of the first SIM card 210. By way of example, the stationary operation is performed on the basis of one or combinations of the following:

Active set: so long as the reception strengths of the active radio cells (i.e. the active radio cells in the soft handover) do not change substantially, the composition of the active set remains the same. The mobile radio network alters it only when radio cells become weaker than other radio cells which are observed by adjacent cell measurement (e.g. RSCP/EcN0 measurement in the adjacent cell). With an unaltered active set, it can be assumed that the mobile radio is not moving at all or is moving only a little.

Serving radio cell (serving cell): the serving radio cell (e.g. the HSDPA/HSUPA serving cell) is typically the strongest radio cell in the active set. If this does not change, it can be assumed that the mobile radio terminal is not moving or is moving only a little.

Observed set (monitored set): the composition of the observed set (typically the set of all radio cells in the adjacency of the serving radio cell) is determined by the mobile radio network and is location specific. So long as the observed set does not change, it can be assumed that the mobile radio terminal is not moving or is moving only a little.

Adjacent cell measurements: individual evaluations of the RSCP measurement and the EcN0 measurement for the adjacent radio cells (e.g. the third radio cell 206). By stipulating measurement corridors for RSCP and EcN0 (i.e. value ranges for RSCP and EcN0, for example), it is possible to use an appropriate algorithm to take specific changes in the measured variables (e.g. RSCP and EcN0) as a basis for inferring movement of the mobile radio terminal or stationary operation of the mobile radio terminal 209.

PI: measurement of the quality of the received PI (Paging Indicator) allows a statement about whether the mobile radio is moving away from the second radio cell 205. In this case, the stationary operation is not performed by observing parameters (e.g. UMTS configuration parameters) for the first SIM card 210, for example, but rather takes place by means of the paging channel of the second SIM card 211.

If the mobile radio terminal 209 establishes in 705 that it is not being operated on a stationary basis, it performs the reception quality measurements in 706 normally (e.g. on the basis of the standard).

If the mobile radio terminal 209 establishes in 705 that it is being operated on a stationary basis, it does not perform the reception quality measurements or at least the reception quality measurements for the adjacent cells in 706. By way of example, exclusively operations 1)-3), that is to say synchronization with the first radio cell 204 and the actual paging process, are performed for the second SIM card 211 during the communication link by means of the first SIM card 210. Given appropriate optimization of the synchronization, it is thus possible to reduce the interruption time for the communication link of the first SIM card 210.

By way of example, if the result of the paging indicator channel is negative (which can be expected as the norm in a mobile radio network that is not overcrowded, for example), it is possible to reduce the interruption time to a small amount <2.5 ms. In the case of such an interruption time at an interval of one second, it can be assumed that the influence on the reception of the communication link of the first SIM card 210 is small. Similarly, there are no impairments and the accessibility by means of the second SIM card 211 to be expected during physically static operation.

A comparison between the case in which the adjacent cell measurements (operations 5) and 6)) are performed and the case in which the adjacent cell measurements are not performed is shown in FIG. 8.

FIG. 8 shows a first diagram 801 for the case with adjacent cell measurements and a second diagram 802 for the case without adjacent cell measurements.

As an example, the two diagrams 801, 802 show first data packets 803 which can be transmitted via a dedicated channel (DCH) using the communication link which exists for the first SIM card 210 and second data packets 804 which can be transmitted on the basis of HSDPA (High Speed Data Packet Access) via the communication link which exists for the first SIM card 210. By way of example, a DCH data link and an HSDPA data link or both exist for the first SIM card 210, and accordingly the first data packets 803, the second data packets 804 or both are transmitted to the mobile radio terminal 209.

In the first diagram 801, hatching indicates those data packets which are impaired, e.g. cannot be received correctly, by the changeover of the receiver for reception of the paging indicator 804 and for performance of the adjacent cell measurements 806.

In the second diagram 802, hatching indicates those data packets which are impaired by the changeover of the receiver for reception of the paging indicator 804, since in this case it is assumed that the adjacent cell measurements are dispensed with.

It can be seen that when changing to the second SIM card 210 both for reading the PI and for the adjacent cell measurements, a plurality of DCH data packets 803 (e.g. DCH frames) and HSDPA data packets 804 (e.g. HSDPA frames) are affected. The communication link which exists for the first SIM card 210 (in this example the DCH link and/or the HSDPA link) is subjected to substantial interference.

When the adjacent cell measurements are dispensed with during stationary operation, the influence on the communication link which exists for the first SIM card 210 is limited to a single DCH data packet 803 or a single HSDPA data packet 804, since the length of the PI 805 is only a fraction of a data packet timeslot. On account of the redundancy in the data stream, it is typically even not possible to observe any influence on the communication link at all, since the data packet can still be decoded correctly despite the portion that is not received.

In 708, a check is performed to determine whether the mobile radio terminal 209 is still in stationary operation. This is checked periodically, for example. If physically static operation is abandoned, this can be established in the mobile radio terminal 209 by virtue of the correlation when reading the paging indicator channel becoming poorer or by evaluating parameters on the first SIM card 210 in a manner similar to detection of stationary operation in 704.

If the mobile radio terminal 209 continues to be in stationary operation, there continue to be no reception quality measurements (or at least no adjacent cell measurements, for example) performed in 707.

When the mobile radio terminal 209 has abandoned stationary operation, reception quality measurements are performed normally in 706. If the movement of the mobile radio terminal 209 means that no further signals are received from the second radio cell 205 and the dispensation with the reception quality measurements means that the change to an adjacent cell was not made in timely fashion, the communication link for the first SIM card 210 can be terminated and reregistration can be performed for the second SIM card 211, for example in the third radio cell 206.

The following examples pertain to further embodiments.

Example 1 is a mobile communication apparatus, including: a receiver; an ascertainment device which is set up to ascertain whether the movement of the mobile communication apparatus is below a prescribed limit; and a control device which is set up to prompt the receiver to perform a signal reception quality measurement on the basis of whether the movement of the mobile communication apparatus is below the prescribed limit.

In Example 2, in the subject matter of Example 1, the control device may be set up to prompt the receiver to perform the signal reception quality measurement if the movement is not below the prescribed limit and to prompt the receiver not to perform the signal reception quality measurement if the movement is below the prescribed limit.

In Example 3, in the subject matter of any one of Examples 1-2, the ascertainment device may be set up to ascertain whether the mobile communication apparatus is stationary.

In Example 4, in the subject matter of Example 3, the control device may be set up to prompt the receiver to perform the signal reception quality measurement if the mobile communication apparatus is not stationary and to prompt the receiver not to perform the signal reception quality measurement if said mobile communication apparatus is stationary.

In Example 5, the subject matter of any one of Examples 1-4 can optionally include a first subscriber identity module for using a first mobile radio communication network and a second subscriber identity module for using a second mobile radio communication network, wherein the control device is set up to use the receiver to maintain a communication link to the first mobile radio communication network, and the signal reception quality measurement is a measurement of the reception quality of a signal received by the receiver from the second mobile radio communication network.

In Example 6, in the subject matter of any one of Examples 1-5, the ascertainment device may be set up to take at least one configuration parameter from the receiver for using the communication link as a basis for ascertaining whether the movement of the mobile communication apparatus is below the prescribed limit.

In Example 7, in the subject matter of any one of Examples 1-6, the signal reception quality measurement may be the measurement of the reception quality of the radio cell that serves the mobile communication apparatus.

In Example 8, in the subject matter of any one of Examples 1-7, the signal reception quality measurement may be the measurement of the reception quality of a radio cell that is adjacent to the radio cell that serves the mobile communication apparatus.

In Example 9, in the subject matter of any one of Examples 1-8, the mobile communication apparatus may be a mobile radio terminal Example 10 is a method for performing signal reception quality measurements by a mobile communication apparatus, the method including: ascertaining whether the movement of the mobile communication apparatus is below a prescribed limit; and prompting of a receiver in the mobile communication apparatus to perform a signal reception quality measurement on the basis of whether the movement of the mobile communication apparatus is below the prescribed limit.

Example 11 is a mobile communication apparatus, including: a transmission/reception device for communicating with a mobile radio communication network; and an ascertainment device which is set up to take at least one configuration parameter from the transmission/reception device as a basis for ascertaining whether the movement of the mobile communication apparatus is below a prescribed limit In Example 12, in the subject matter of Example 11, the ascertainment device may be set up to take the at least one configuration parameter as a basis for ascertaining whether the mobile communication apparatus is stationary.

In Example 13, in the subject matter of any one of Examples 11-12, the transmission/reception device may be set up to receive the configuration parameter from the mobile radio communication network.

In Example 14, in the subject matter of any one of Examples 11-13, the ascertainment device may be set up to take whether the configuration parameter changes as a basis for ascertaining whether the movement of the mobile communication apparatus is below a prescribed limit.

In Example 15, in the subject matter of any one of Examples 11-14, the configuration parameter may be a configuration parameter that is configured by the mobile radio communication network for the mobile communication apparatus.

In Example 16, in the subject matter of any one of Examples 11-15, the configuration parameter may be the set of radio cells in the mobile radio communication network that is active for the mobile communication apparatus, is the radio cell that serves the mobile communication apparatus or is the set of adjacent radio cells that is configured for the mobile communication apparatus.

Example 17 is a method for ascertaining a movement by a mobile communication apparatus, the method including: ascertaining, on the basis of at least one configuration parameter from a transmission/reception device in the mobile communication apparatus, of whether the movement of the mobile communication apparatus is below a prescribed limit.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communication apparatus, comprising:
   a receiver;
   a first subscriber identity module for using a first mobile radio communication network and a second subscriber identity module for using a second mobile radio communication network;

an ascertainment device, comprising at least one processor, configured to ascertain, based on adjacent cell measurements from the first subscriber identity module or based on at least one configuration parameter pertaining to usage of the first mobile communication network via the first subscriber identity module, whether a movement of the mobile communication apparatus is below a prescribed limit; and a control device, comprising at least one processor, configured to prompt the receiver to perform a signal reception quality measurement of a signal received by the receiver from the second mobile radio communication network based on whether a movement of the mobile communication apparatus is below the prescribed limit as determined from the first mobile communication network;

wherein the control device is set up to prompt the receiver to perform the signal reception quality measurement of the signal received by the receiver from the second mobile radio communication network if the movement is not below the prescribed limit and to prompt the receiver not to perform the signal reception quality measurement of the signal received by the receiver from the second mobile radio communication network if the movement is below the prescribed limit and is further configured to report a previous reception quality measurement to the second mobile radio communication network to simulate a performed reception quality measurement if the movement is below the prescribed limit.

2. The mobile communication apparatus as claimed in claim 1,
wherein the ascertainment device is set up to ascertain whether the mobile communication apparatus is stationary.

3. The mobile communication apparatus as claimed in claim 2,
wherein the control device is set up to prompt the receiver to perform the signal reception quality measurement of the signal received by the receiver from the second mobile radio communication network if the mobile communication apparatus is not stationary and to prompt the receiver not to perform the signal reception quality measurement of the signal received by the receiver from the second mobile radio communication network if said mobile communication apparatus is stationary.

4. The mobile communication apparatus as claimed in claim 1,
wherein the control device is set up to use the receiver to maintain a communication link to the first mobile radio communication network.

5. The mobile communication apparatus as claimed in claim 1,
wherein the signal reception quality measurement of the signal received by the receiver from the second mobile radio communication network is a measurement of a reception quality of a radio cell that serves the mobile communication apparatus.

6. The mobile communication apparatus as claimed in claim 1,
wherein the signal reception quality measurement of the signal received by the receiver from the second mobile radio communication network is a measurement of the reception quality of a radio cell in the second mobile radio communication network that is adjacent to a radio cell that serves the mobile communication apparatus.

7. The mobile communication apparatus as claimed in claim 1,
wherein the mobile communication apparatus is a mobile radio terminal.

8. The mobile communication apparatus as claimed in claim 1,
wherein the signal reception quality measurement of the signal received by the receiver from the second mobile radio communication network is not performed if a communication link is active for the first mobile radio communication network in addition to the movement being below the prescribed limit.

9. The mobile communication apparatus as claimed in claim 8,
wherein the previous reception quality measurement is performed before a setup of the communication link.

10. A method for performing signal reception quality measurements by a mobile communication apparatus, the method comprising:
ascertaining, through use of an ascertainment device, comprising at least one processor that is configured to ascertain, based on adjacent cell measurements from a first subscriber identity module or based on at least one configuration parameter pertaining to usage of a first mobile communication network via a first subscriber identity module, whether a movement of the mobile communication apparatus is below a prescribed limit;
prompting, by a control device, comprising at least one processor that is configured to prompt, a receiver in the mobile communication apparatus to perform a signal reception quality measurement of a signal received by the receiver from a second mobile radio communication network based on whether a movement of the mobile communication apparatus is below the prescribed limit as determined from the first mobile communication network, wherein the control device is set up to prompt the receiver to perform the signal reception quality measurement of the signal received by the receiver from the second mobile radio communication network if the movement is not below the prescribed limit and to prompt the receiver not to perform the signal reception quality measurement of the signal received by the receiver from the second mobile radio communication network if the movement is below the prescribed limit; and
reporting, by the control device, a previous reception quality measurement to the second mobile radio communication network to simulate a performed reception quality measurement if the movement is below the prescribed limit.

11. The method as claimed in claim 10,
wherein the signal reception quality measurement of the signal received by the receiver from the second mobile radio communication network is not performed if a communication link is active for the first mobile radio communication network in addition to the movement being below the prescribed limit.

12. The method as claimed in claim 11,
wherein the previous reception quality measurement is performed before a setup of the communication link.

* * * * *